March 29, 1938.  H. W. HOUGHTON  2,112,624
FUMIGANT APPARATUS
Filed March 27, 1933

Inventor
Harry W. Houghton
By Emery, Booth, Varney & Holcombe
his Attorneys

Patented Mar. 29, 1938

2,112,624

UNITED STATES PATENT OFFICE 2,112,624

FUMIGANT APPARATUS

Harry W. Houghton, Glen Echo, Md., assignor to Safety Fumigant Company, a corporation of Massachusetts Application March 27, 1933, Serial No. 663,092

1 Claim. (Cl. 21—108)

This invention relates to fumigant gas having toxic and warning properties of the general nature of that described in my Patent No. 1,521,537, dated December 30, 1924, and particularly to a safe and convenient mode of generating the gas from a mixture of chemicals in powdered form, such as that described in my Patents No. 1,704,607, dated March 5, 1929, and No. 1,894,041, dated January 10, 1933, upon which this invention is an improvement.

The invention aims to increase the speed with which the fumigant gas can be generated with safety, and to increase the concentration of the gas obtainable under normal operating conditions, thereby increasing its effectiveness against rats, bed bugs, moths and other pests difficult to destroy by other methods.

The cakes or briquettes containing sodium cyanide and sodium chlorate heretofore used with success for generating the fumigant gas at the place of use, as described in my Patent No. 1,663,082, dated March 20, 1928, require in addition considerable quantities of hydrochloric acid, which is bulky and dangerous to store and handle, and can not conveniently be used except where suitable facilities are at hand. The present improvement enables all of the materials to be supplied in dry form at the place of use, and by utilizing cheap ingredients, results in a considerable saving in cost as compared with prior methods equally effective.

According to the present invention, the sodium cyanide, or other suitable source of cyanogen, is mixed in powdered form with an equal weight of chlorinated lime, or other chlorine liberating agent, such as bleaching powder, and packed in air tight moisture proof containers. An equal weight of crude sodium bisulfate, containing about 33% of sulfuric acid, is packed in a similar container.

For domestic use, the two containers may be put up in a single package, with suitable directions for use, and shipped anywhere without danger.

The preferred mode of use contemplates generating the fumigant gas in the space to be fumigated, all openings into which should be arranged to be sealed as tightly as possible against air leakage before preparing the chemicals. The sodium bi-sulfate is first dissolved in cold water, using about two quarts per pound of material. This solution is placed in an open pan or tub. The sodium cyanide and chlorinated lime mixture is placed in a suitable porous receptacle and floated on the sodium bi-sulfate solution to prevent immediate commingling of the chemicals, which would result in almost instantaneous generation of the fumigant gas.

As the sodium bi-sulfate percolates through the receptacle and reaches the mixture of cyanide and chlorine liberating material a gaseous combine of cyanogen chloride and hydrocyanic acid gas is produced having very strong lachrymatory and toxic properties. This gas is very effective as a fumigant, as it contains a large amount of hydrocyanic acid gas, but the proportion of cyanogen chloride is sufficient at all stages of the process to give an overpowering lachrymatory effect. Experiments indicate the presence of not less than 50% cyanogen chloride in the gaseous combine throughout the fumigating operation.

The porous receptacle may be made of unglazed pulp or strawboard, or less porous material preferably penetrated by holes covered with tissue paper to accelerate its penetration by the bi-sulfate solution. A metal receptacle similar to that illustrated in the accompanying drawing may advantageously be utilized.

Figure 1:
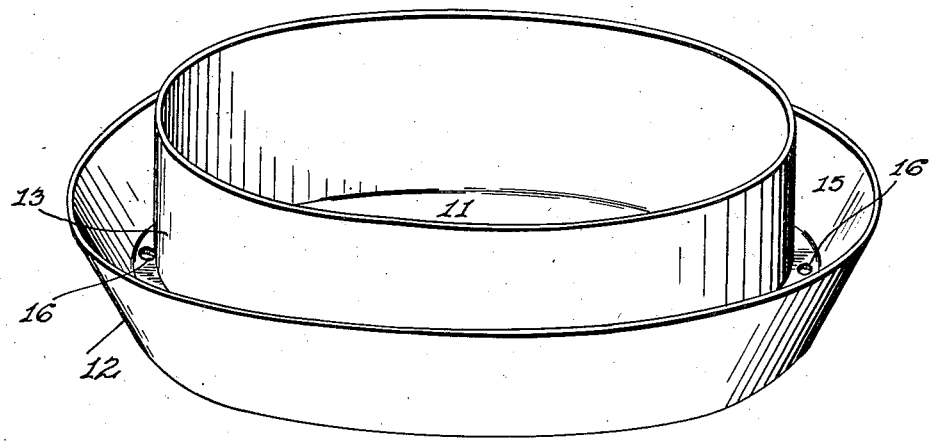
Fig. 1 is a perspective view of a preferred form of receptacle.

The porous receptacle illustrated in the drawing comprises a shallow pan 11 of galvanized iron or other suitable sheet material, having its edge flanged up to form a continuous side wall 12, and within which is a second wall 13 forming an open container for the mixture of dry chemicals 14, for example, sodium cyanide and chlorinated lime. Between the outer and inner walls 12, 13, is an annular space 15 providing excess buoyancy for the porous receptacle when charged with chemicals and floating on the bi-sulfate solution. One or more holes or orifices 16 are provided in the bottom of the receptacle in this space to permit it to fill slowly with sodium bi-sulfate solution until it sinks and thereby submerges the dry chemicals in the solution.

Figure 2:
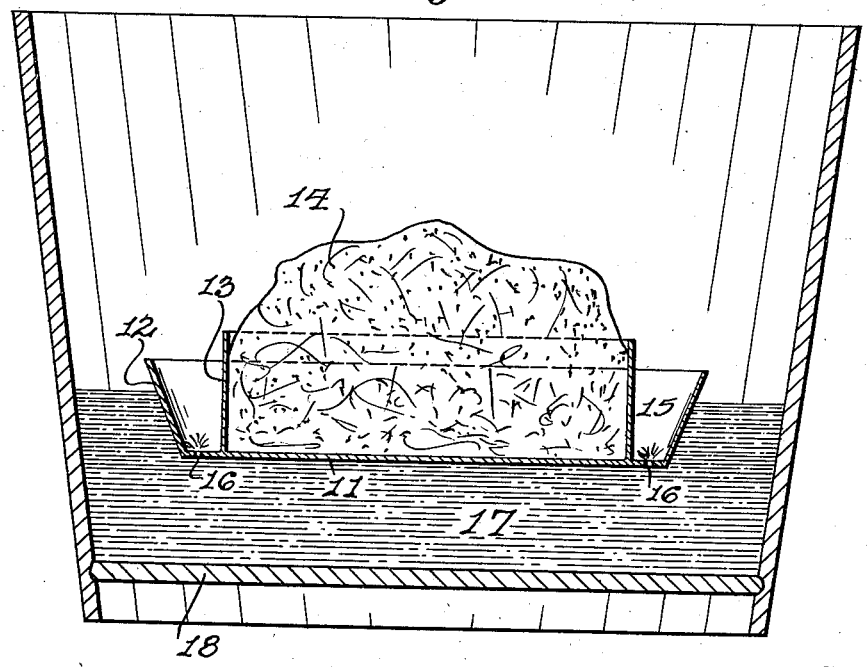
Fig. 2 is a cross-section of the pan or other container for the sodium-bi-sulfate solution, showing the mode of use of the apparatus and chemicals for generating fumigant gas.

In Fig. 2 of the drawing the porous receptacle 11 is illustrated charged with dry chemicals 14 and floating on the surface of the sodium bi-sulfate solution 17 in an open tub 18. The tub should not be charged over one-third full of sodium bi-sulfate solution, as otherwise the heat and gas generated when the sodium cyanide and chlorinated lime are submerged in it and the gas forming reaction starts might be enough to make the solution foam over the top of the tub.

I find that sudden submergence of the dry chemicals in the bi-sulfate solution produces a more toxic concentration of fumigant gas than the slower percolation of the solution through the bottom of a porous receptacle. By delaying the time of submergence after the materials and apparatus are made ready and set up as above described, generation of the fumigant gas may be delayed sufficiently to permit the operator to escape to a place of safety and completely seal the chamber in which the fumigation is taking place so as to avoid exposing anyone to danger.

The invention is not restricted to the apparatus shown and described, nor to the chemicals and mode of operation used as in the illustrative example.

What I claim and desire to secure by Letters Patent is as follows:

An open receptacle adapted to float on a liquid and having a compartment for holding a dry material and a second compartment for receiving liquid, said second compartment having orifices in its bottom to permit slow leakage of liquid into said compartment to sink the receptacle.

HARRY W. HOUGHTON.